United States Patent
Pearson et al.

(10) Patent No.: US 6,438,610 B1
(45) Date of Patent: Aug. 20, 2002

(54) SYSTEM USING BUFFERS FOR DECOMPRESSING COMPRESSED SCANNER IMAGE DATA RECEIVED FROM A NETWORK PERIPHERAL DEVICE AND TRANSMITTING TO A CLIENT'S WEB BROWSER

(75) Inventors: Daniel R. Pearson, Roseville; David A. Kumpf, Rocklin, both of CA (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

(21) Appl. No.: 09/406,008

(22) Filed: Sep. 24, 1999

(51) Int. Cl.7 .............................................. G06F 15/16
(52) U.S. Cl. ...................... 709/247; 709/219
(58) Field of Search ................. 341/50; 346/135.1; 345/501; 709/247, 219, 216, 217, 218, 248

(56) References Cited

U.S. PATENT DOCUMENTS 5,568,489 A * 10/1996 Yien et al. .................... 341/50
5,799,150 A * 8/1998 Hamilton et al. ........ 346/135.1
6,112,250 A * 8/2000 Appelman .................. 709/203
6,157,743 A * 12/2000 Goris et al. ................. 345/501

FOREIGN PATENT DOCUMENTS

| JP | 58139568 A | * | 8/1983 | ............. G06F/3/04 |
| JP | 09224208 A | * | 8/1997 | ............ H04N/5/765 |
| JP | 10051314 A | * | 2/1998 | ............. H03M/7/30 |

* cited by examiner

Primary Examiner—Le Hien Luu
Assistant Examiner—Chau Nguyen

(57) ABSTRACT

A method and apparatus for decompressing and communicating a predetermined amount of data in a client-server environment in which the server relays communications between a client web browser and at least one shared peripheral device. Compressed data from the peripheral device is decompressed on-the-fly, and is packaged and transmitted to the client web browser. Appropriate logic is provided to ensure that the web browser receives an expected amount of decompressed data regardless of the amount of compressed data provided by the peripheral device. Moreover, logic is provided to reduce the amount of resources required in decompressing the data.

14 Claims, 2 Drawing Sheets

SYSTEM USING BUFFERS FOR DECOMPRESSING COMPRESSED SCANNER IMAGE DATA RECEIVED FROM A NETWORK PERIPHERAL DEVICE AND TRANSMITTING TO A CLIENT'S WEB BROWSER

The present invention generally relates to a method and apparatus for decompressing data in a client-server environment. More particularly, the present invention concerns software/firmware which reduces the memory resources required in decompressing data received on-the-fly from a network peripheral device and transmitting the same to a client web browser.

Scanning peripherals are becoming a larger segment of the peripheral industry. Users find such peripherals useful as a means of input for text, graphics and images. Many software applications now permit manipulation and use of such data. Some peripherals combine scanning with other functions. These multifunction peripherals are popular, in part, because of their ability to combine multiple useful functions into a single device. When connected to the network, the peripherals are operationally connected to the client devices via a dedicated peripheral server, which includes software and firmware for allowing the clients to interact with the peripherals using a web browser. Such software and firmware are disclosed in commonly assigned U.S. patent application Ser. No. 09/163,791 filed Sept. 30, 1998, now U.S. Pat. No. 6,289,371 by Kumpfet al., which application is incorporated by reference herein.

Generally, the invention disclosed in the Kumpf et al. application provides an interactive networked client-server scan method launched and actively managed through a web browser interface on a client. A server responds to a universal resource locator (URL) address identifying the server with a general purpose format software program that creates an interface in the client web browser and enables the client to interact with the server in initiating, altering and monitoring scan jobs and related data.

The present invention is directed toward improvements to the above-noted disclosure which enable a reduction in the amount of resources needed to decompress the data generated by the peripheral. Notably, peripheral devices such as, for example, a scanning device generate large amounts of data which is typically transmitted in a compressed format. However, a general purpose web browser like NETSCAPE NAVIGATORS® or MICROSOFT INTERNET EXPLORERS® typically expects to receive a predefined amount of decompressed data. Due to a variety of factors, it is difficult to predict the amount of data generated by a scan, even if the size of the image being scanned is known. Moreover, it is difficult to accurately predict the amount of decompressed data that will be yielded from decompressing a given amount of compressed data.

Accordingly, it is an object of the present invention to provide an improved method for decompressing data to be displayed on a software viewer in a client-server environment in which a scan server device relays communications over a network between at least one shared peripheral device which provides data in a compressed format and a web browser residing on a client device and expecting a predetermined amount (view-size) of decompressed data.

It is a further object of the present invention to provide such a method in software or firmware residing on either the scan server or the client device.

SUMMARY OF THE INVENTION

The present invention provides a method and apparatus for decompressing and communicating a predetermined amount of data in a client-server environment in which the server relays communications between a client web browser and at least one shared peripheral device. Compressed data from the peripheral device is decompressed on-the-fly, and is packaged and transmitted to the client web browser. Appropriate logic is provided to ensure that the web browser receives an expected amount of decompressed data regardless of the amount of compressed data provided by the peripheral device. Moreover, logic is provided to reduce the amount of resources required in decompressing the data.

According to one aspect of the invention, an inbound buffer storing compressed data is replenished each time the inbound buffer becomes depleted.

According to another aspect of the invention, an outbound buffer storing decompressed data is transmitted to the web browser when the amount of decompressed data contained in the outbound buffer (amt-stored) is at least a given predetermined value.

According to yet another aspect of the invention, the inbound buffer storing compressed data is replenished concurrently with data decompression, such that compressed data is being stored in said inbound buffer as compressed data is being decompressed and stored in the outbound buffer.

In a preferred embodiment of the invention, the data decompression logic is embodied software/firmware on the scan server. The scan server requests blocks of decompressed data from the shared peripheral device, and decompresses and transmits the decompressed data on-the-fly to the client web browser. The server tracks the amount of data transmitted, and if necessary initiates a padding/truncation operation to ensure that the client web browser receives the expected amount of data.

BRIEF DESCRIPTION OF THE DRAWINGS

Other objects, features and advantages will become apparent upon reading the following detailed description, in conjunction with the attached drawings, in which.

DETAILED DESCRIPTION

Broadly stated, the present invention is directed to a method for reducing the amount of memory required in decompressing data while ensuring that a predetermined amount of data is decompressed. The present invention is realized through software, firmware, and hardware which provides on-the-fly decompression of data in a client-server environment in which a web browser residing on a client device specifies an expected amount of decompressed data to be received and a peripheral device transmits a given amount of data which may or may not equal the expected amount of decompressed data.

Figure 1:
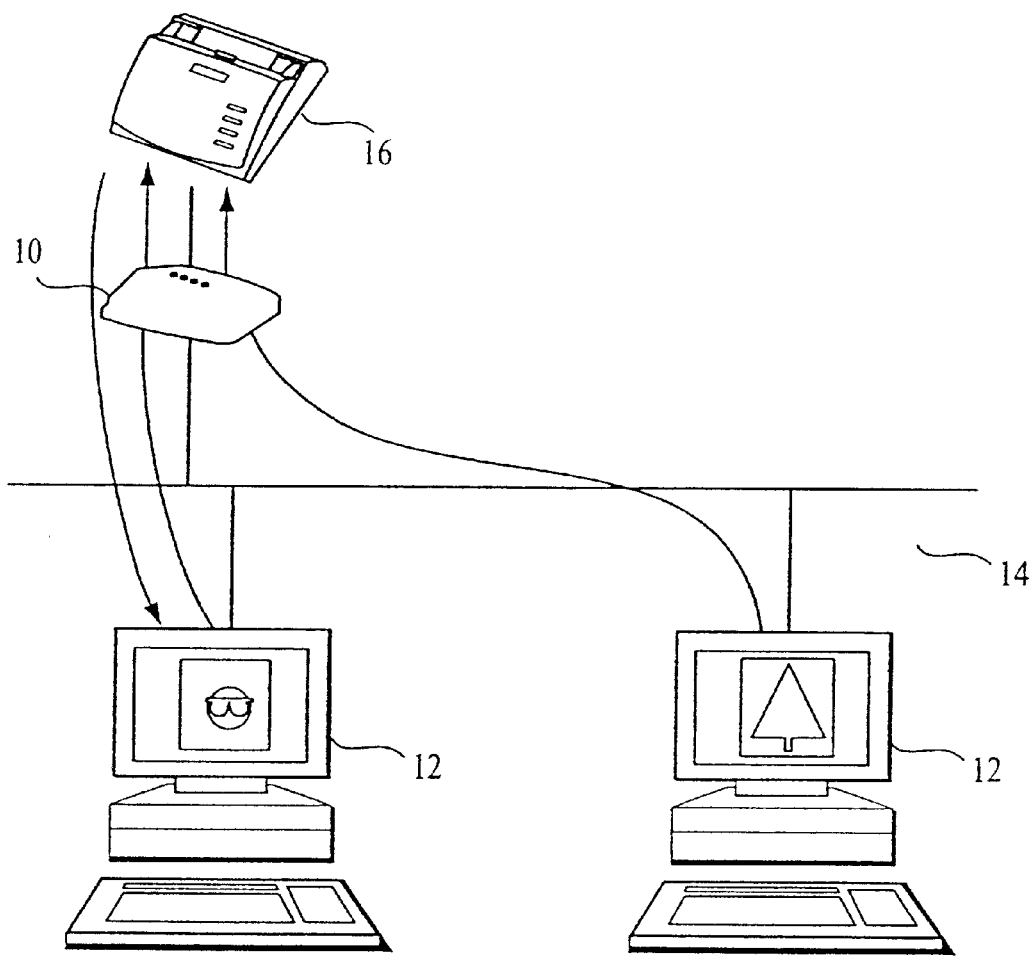
FIG. 1 is an overview of network system in which the present method is preferably applied.

Turning now to the drawings, and particularly FIG. 1, the present invention is implemented in a network system including a network peripheral server 10 such as a Hewlett-Packard JETDIRECT box. The JETDIRECT box is shown and described in a Hewlett-Packard user manual part no. 5967-2290, and is incorporated by reference herein. It should be understood, however, that the functions of the server 10 can be performed, for example, as part of a card that connects via a bus interface to the peripheral, or as part of an internal central processing unit (CPU) of an attached network peripheral. The server 10 is connected to a plurality of clients 12, which are typically and preferably personal computers (PC), via a network 14. The server 10 also operatively connects the clients 12 to a peripheral device 16 such as a scanner, which may be a stand alone scan peripheral or a multifunction peripheral (MFP) that performs various functions such as printing and scanning. The server 10 connects to a network port through a network interface unit (not shown) in a known manner and permits clients 12 to access the scanner 16.

Using a general purpose web browser like NETSCAPE NAVIGATORS® or MICROSOFT INTERNET EXPLORER® it is possible to view image data produced by the peripheral device 16 on the client 12. However, one difficulty encountered in using general purpose web browsers is the need to provide the web browser with an expected amount of image data. Notably, the web browser will not release the peripheral device 16 until it receives the expected amount of data. Consequently, it is necessary to insure that the web browser will receive the expected amount of data even if the peripheral device 16 provides an insufficient amount of data. Still further, it is wasteful of system resources to decompress more data than is expected by the web browser.

Figure 2:
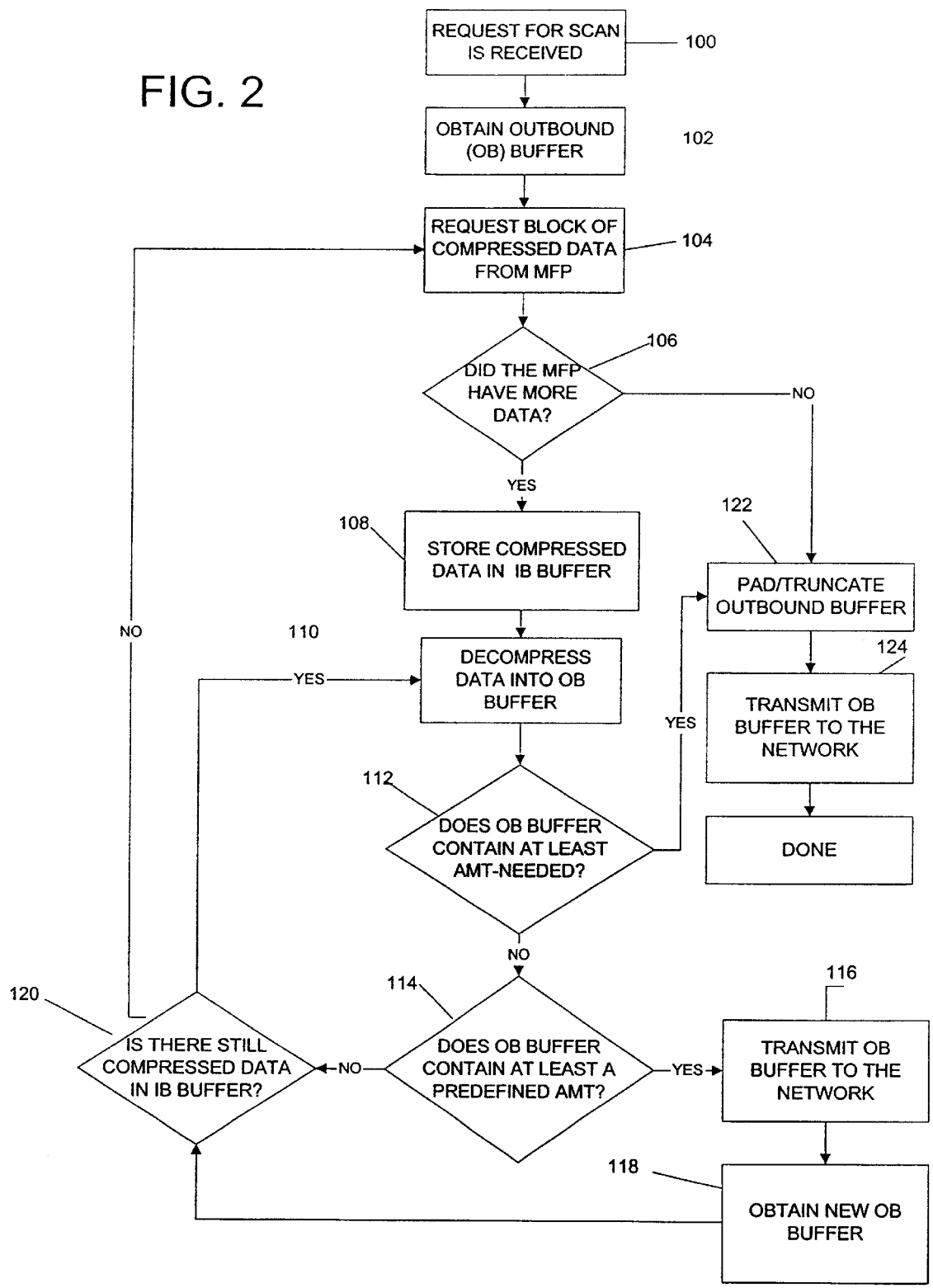
FIG. 2 is a flow chart of the data decompression method of the present invention.

The method and apparatus of the present invention will now be explained with reference to the flow chart illustrated in FIG. 2.

In operation, the client 12 initiates a request to view data such as image data generated by the peripheral device 16 (step 100). The request is received by the server 10 which in turn causes the peripheral device 12 to initiates a scanning operation.

It should be appreciated that the server receives data from the peripheral device 16 generally in real-time, and that neither the server 10, the web browser nor the peripheral device 16 are aware of the true overall size of the image data at the time the scanning operation is initiated. Rather, all that is actually known is the amount of decompressed data (view-size) expected by the client web browser. Importantly, the actual amount of data generated by the scanning operation does not necessarily correlate to the view-size expected by the client web browser.

According to a first embodiment of the present invention, data decompression is handled by the server 10. As noted, above, the server 10 does not know the overall size of the image data being generated by the peripheral device 16. Consequently, to avoid a data overflow condition in which the amount of data transmitted by a peripheral device exceeds the memory capacity of the server 10, the server 10 decompresses and transmits predetermined blocks of image data to the web browser on-the-fly. In other words, the server 10 does not attempt to decompress the entire the image data before initiating transfer of data to the web-browser. Rather, the server 10 processes individual blocks of a predetermined amount of compressed data to completion (decompressing the data and transmitting it to the client web browser). Depending on the resolution and size of the scanned image, the image data can easily total several megabytes (MB). Assuming that a non-trivial amount of data is being decompressed, the size in bytes of compressed data being processed on-the-fly is significantly smaller than the total image size. Notably, according to a preferred embodiment, the inbound buffer is capable of storing 512 bytes. However, one of ordinary skill in the art will appreciate that other buffer capacities may readily be adopted as needed. The optimal size of the inbound buffer may depend on the peripheral being used.

The size of the block, i.e., the amount of compressed data requested, is optimized in correspondence with the amount of bandwidth (communications speed) of the network the processing speed of the server 10, and the available memory resources of the server. Obviously, the upper limit of the block size is limited by the memory capacity of the server 10. In any event, the block size of data processed by the server 10 is unrelated to the overall size of the compressed image, which is of an unknown size. Moreover, it should be appreciated that data transport throughput and a reduction in memory resources are both facilitated by the on-the-fly data decompression processing of the present invention.

The server 10 stores compressed data in an inbound buffer and decompresses the data into an outbound buffer. Toward this end, the server 10 allocates an inbound buffer for storing a given block of compressed data and an outbound buffer (step 102) for storing decompressed data (step 102). It should be noted that the size of the inbound buffer need not be equal to the size of the outbound buffer. Rather, the inbound buffer is ideally capable of storing at least a predefined amount of data, which predefined amount corresponds to an optimum data transmission size. The optimum transmission size of a data packet is beyond the scope of the present invention. Moreover, one of ordinary skill in the art will appreciate the fact that the optimum transmission size of a data packet is a constant which is determined, for example, when the initial network connection is established between the web browser and the server.

After allocating the outbound buffer, the server 10 requests the peripheral device 16 to transmit a predetermined amount of compressed data (step 104). The server 10 verifies that same data was received in response to the request (step 106). Assuming that data has been received, the server 10 stores the data in the inbound buffer (step 108). As noted above, the amount of data requested corresponds to an optimum transfer size. However, depending on the image size, the amount of data actually received may be less than the amount requested. The situation in which no data is received will be explained below.

Once the compressed data has been stored in the inbound buffer, the server commences decompression of the data into the outbound buffer (step 110). The server 10 tracks the amount of data contained in the outbound buffer and continues to decompress data into the outbound buffer until the amount of data reaches either (a) at least a remaining amount of data expected by the client browser (step 112), or (b) at least a predefined optimum transport size (step 114).

Upon storing the predefined optimum transport size ("yes" branch in step 114), the outbound buffer is passed to the network which transmits the data to the web browser (step 116), whereupon allocation of a new outbound buffer is requested (step 118).

After securing allocation of a new outbound buffer, the server verifies whether additional compressed data is stored in the inbound buffer (step 120) and continues decompressing data (step 110), etc.

Periodically the server 10 requests the transfer of additional data from the peripheral device 16 ("no" branch in step 120). According to one aspect of the invention, the transfer of additional compressed data is requested each time the amount of compressed data contained in the inbound buffer drops below a predetermined amount. Moreover, according to a second aspect of the invention, the transfer of additional data occurs concurrently with decompression, i.e., removal, of data.

The server 10 continually monitors the amount of data transmitted to the client 12 (amt-sent) as well as the remaining amount of data still expected by the client 12 (amt-needed) which value corresponds to the difference between the amount of data expected by the client (view-size) and the amount of data transmitted (amt-sent). When the remaining amount of data still expected by the client 12 (amt-needed) is less than or equal the amount of decompressed data in the outbound buffer, the server 10 initiates a padding/truncation step (step 122).

In the padding/truncation step the data contained in the outbound buffer is padded/truncated such that the amount stored in the buffer is equal to the remaining amount of data still expected by the client 12 (amt-needed). Subsequently, the outbound buffer is passed to the network (step 124) and the inbound buffer is deallocated, with any remaining data in the inbound buffer being discarded.

Next, the situation in which the peripheral device 16 does not transfer additional data ("no" branch in step 106) will be examined. Notably, on occasion, the view-size expected by the client device may exceed the amount of data generated by the peripheral device 16. As noted above, this situation is important as the client will not release the peripheral device 16 until the expected amount of data (view-size) is received. Thus, to deal with this situation in which no additional compressed data is available and the amount of data contained in the outbound buffer is less than the remaining amount of data expected by the client (amt-needed), the server again initiates the padding/truncation step (step 122). This time, predefined null data is added to the outbound buffer, i.e., the buffer is padded, such that the amount stored in the buffer is equal to the remaining amount of data still expected by the client (amt-needed). Subsequently, the outbound buffer is passed to the network (step 124) and the inbound buffer is deallocated, with any remaining data in the inbound buffer being discarded.

According to a second embodiment of the present invention, data decompression is handled by software/firmware on the client device 12. Notably, the inbound and outbound buffers and the logic for decompressing the data all reside on the client device, and generally the same process depicted in FIG. 2 is followed. However, communications between the client device 12 and the peripheral device 16 are relayed by the server 16. Specifically, the server 16 converts a generic data request command issued by the client device into a device specific form which may be interpreted by the peripheral device 16. All other aspects of the invention are similar to the above-described aspects.

Notably, the client 12 processes individual blocks of a predetermined amount of compressed data to completion before requesting the transfer of additional compressed data. The client 12 stores compressed data in an inbound buffer and decompresses the data into an outbound buffer. Similar to the first embodiment, after allocating the outbound buffer, the client 12 relays a command to the peripheral device 16 via the server 10 requesting transmission of a predetermined amount of compressed data (step 104). The server verifies that data is in fact being transferred within a given time period (step 106). Assuming that data has been received, the server forwards the data to the client which stores the data in the inbound buffer (step 108). As noted above, the amount of data requested corresponds to an optimum transfer size. However, depending on the image size, the amount of data actually received may be less than the amount requested. The situation in which no data is received is handled in a like manner as described with reference to the first embodiment.

As described above, once the compressed data has been stored in the inbound buffer, the client 12 commences decompression of the data into the outbound buffer (step 110). The client 12 tracks the amount of data contained in the outbound buffer and continues to decompress data into the outbound buffer until the amount of data reaches either (a) at least a remaining amount of data expected by the browser (step 112), or (b) at least a predefined optimum browser transfer size (step 114).

Upon storing the predefined optimum transport size ("yes" branch in step 114), the outbound buffer is passed to the browser (step 116), whereupon allocation of a new outbound buffer is requested (step 118).

After securing allocation of a new outbound buffer, the client 12 verifies whether additional compressed data is stored in the inbound buffer (step 120) and continues decompressing data (step 110), etc.

Periodically the client 12 relays a command to the server 10 requesting the transfer of additional data from the peripheral device 16 ("no" branch in step 120). According to one aspect of the invention, the transfer of additional compressed data is requested each time the amount of compressed data contained in the inbound buffer drops below a predetermined amount. Moreover, according to a second aspect of the invention, the transfer of additional data occurs concurrently with decompression, i.e., removal of data.

The client 12 continually monitors the amount of data transmitted to the browser (amt-sent) as well as the remaining amount of data still expected by the browser (amt-needed), which value corresponds to the difference between the amount of data expected by the client (view-size) and the amount of data transmitted (amt-sent). When the remaining amount of data still expected by the browser (amt-needed) is less than or equal the amount of decompressed data in the outbound buffer, the client 12 initiates a padding/truncation step (step 122).

In the padding/truncation step the data contained in the outbound buffer is padded/truncated such that the amount stored in the outbound buffer is equal to the remaining amount of data still expected by the browser (amt-needed). Subsequently, the outbound buffer is transferred to the browser (step 124) and the inbound buffer is deallocated, with any remaining data in the inbound buffer being discarded.

The situation in which the peripheral device 16 does not transfer additional data ("no" branch in step 106) is handled in a like manner as the previous embodiment. Notably, in the event that no additional compressed data is available and the amount of data contained in the outbound buffer is less than the remaining amount of data expected by the browser (amt-needed), the client 12 again initiates the padding/truncation step (step 122). This time, predefined null data is added to the outbound buffer, i.e., the buffer is padded, such that the amount stored in the outbound buffer is equal to the remaining amount of data still expected by the browser (amt-needed). Subsequently, the outbound buffer is passed to the browser (step 124) and the inbound buffer is deallocated, with any remaining data in the inbound buffer being discarded.

From the foregoing description, it should be understood that an improved method for decompressing data in a client-server environment has been shown and described which has many desirable attributes and advantages. The present invention provides a fast, reliable approach to decompress data generated by a peripheral device and provide an expected amount of decompressed data to a client web browser. Importantly, the present invention insures that compressed data is not being received faster than it can be decompressed and transmitted to the client web browser. Moreover, the present invention minimizes the amount of memory resources required to decompress the data while assuring that the data provided by the peripheral device does not overflow the amount of memory available.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for decompressing data to be displayed on a software viewer in a client-server environment in which a server device relays communications between at least one peripheral device and at least one client device, wherein the software viewer expects a predetermined amount (view-size) of decompressed data, said method being embodied in at least one of software and firmware executed on at least one of the client device and the server, said method comprising the steps of:
    (a) requesting a first predetermined amount of compressed data from the at least one peripheral device;
    (b) storing said first predetermined amount of compressed data in an inbound buffer;
    (c) decompressing said compressed data and storing decompressed data in an outbound buffer;
    (d) tracking the amount of data contained in the outbound buffer (amt-stored);
    (e) transmitting the data stored in said outbound buffer to the software viewer;
    (f) tracking the amount of data transmitted to the software viewer (amt-sent);
    (g) determining a remaining amount of data expected by the software viewer (amt-needed) as amt-needed=(view-size)−(amt-sent)

(h) repeating steps (a)–(g) until:
        (1) said amount of data stored in said outbound buffer (amt-stored) is at least equal to a remaining amount of data expected by the software viewer (amt-needed), or
        (2) no further compressed data is available in response to said request in step (a); and,
    (i) initiating a truncating/padding operation such that an amount of decompressed data equal to said amt-needed is packaged into a plurality of data packets and transmitted to the software viewer, wherein null data is selectively used to supplement said decompressed data to ensure that the software viewer receives an amount of data equal to the view-size.

2. A method for decompressing data to be displayed on a software viewer according to claim 1, wherein said step of requesting compressed data is executed when an amount of compressed data stored in said inbound buffer is less than a second predetermined value.

3. A method for decompressing data to be displayed on a software viewer according to claim 1, wherein said step of transmitting the outbound buffer is performed at least when the amount of decompressed data in said outbound buffer (amt-stored) is at least a third predetermined value.

4. A method for decompressing data according to claim 1, wherein said step of requesting compressed data is executed concurrently with said data decompressing step.

5. A server relaying communications between at least one client device and at least one peripheral device, said server receiving compressed data from the peripheral device and transmitting decompressed data to the client device, where in response to a view data request from the client device, the server transmits a plurality of data packets of decompressed data which together equal a predetermined amount of decompressed data (view-size) specified by the client device, said server comprising:
    at least one inbound buffer for storing compressed data;
    at least one outbound buffer for storing decompressed data;
    a processor adapted to provide:
        a data request function for requesting transmission of a first predetermined amount of compressed data from the shared peripheral device;
        a data decompression function for decompressing data stored in said at least one inbound buffer and storing said decompressed data in said at least one outbound buffer;
        a data tracking function for tracking an amount of decompressed data transmitted to said client device (amt-sent) and determining a remaining amount of data (amt-needed) as a difference between the view-size and said amt-sent;
        a data transmission function for transmitting said outbound buffer to the client device; and,
        a data padding/truncation function for padding/truncating data stored in said outbound buffer.

6. A server according to claim 5, wherein said data request fiction is initiated when an amount of compressed data stored in said inbound buffer is less than a second predetermined value.

7. A server according to claim 5, wherein said data transmission function is initiated when an amount of decompressed data contained in said outbound buffer is at least a third predetermined value and when said amt-stored is equal to said amt-needed.

8. A server according to claim 5, wherein said data request function is executed concurrently with said data decompression function.

9. A server according to claim 5, wherein said data padding/truncation function is initiated at least when one of:
    no additional data is available in response to a request by said data request function and said amt-needed is less than said amt-stored; and,
    when said amt-stored is at least said amt-needed.

10. Software residing on a client device for selectively requesting and decompressing data generated by a networked peripheral device, the peripheral device being operably connected to client device through a server, the client device including a web browser for initiating operation of the peripheral device and specifying a predetermined amount of decompressed data (view-size), said software comprising:
    at least one inbound buffer for storing compressed data;
    at least one outbound buffer for storing decompressed data;
    a data request function for requesting transmission of a first predetermined amount of compressed data from the networked peripheral device;
    a data decompression function for decompressing data stored in said at least one inbound buffer and storing said decompressed data in said at least one outbound buffer;
    a data tracking function for tracking an amount of decompressed data transmitted to said client device (amt-sent)

and determining a remaining amount of data (amt-needed) as a difference between the view-size and said amt-sent;

a data transmission function for p as sing said outbound buffer to the web browser; and, a data padding/truncation function for padding/truncating data stored in said outbound buffer.

11. Software according to claim 10, wherein said data request function is initiated when an amount of compressed data stored in said inbound buffer is less than a second predetermined value.

12. Software according to claim 10, wherein said data transmission function is initiated when an amount of decompressed data contained in said outbound buffer is at least a third predetermined value and when said amt-stored is equal to said amt-needed.

13. Software according to claim 10, wherein said data request function is executed concurrently with said data decompression function.

14. Software according to claim 10, wherein said data padding/truncation function is initiated at least when one of:

no additional data is available in response to a request by said data request function and said amt-needed is less than said amt-stored; and, when said amt-stored is at least said amt-needed.

* * * * *

UNITED STATES PATENT AND TRADEMARK OFFICE
CERTIFICATE OF CORRECTION

PATENT NO. : 6,438,610 B1
DATED : August 20, 2002
INVENTOR(S) : Daniel R. Pearson et al.

It is certified that error appears in the above-identified patent and that said Letters Patent is hereby corrected as shown below:

<u>Column 8,</u>
Line 31, delete "fiction" and insert therefor -- function --

Signed and Sealed this

Nineteenth Day of October, 2004

JON W. DUDAS
*Director of the United States Patent and Trademark Office*